Patented Aug. 3, 1937

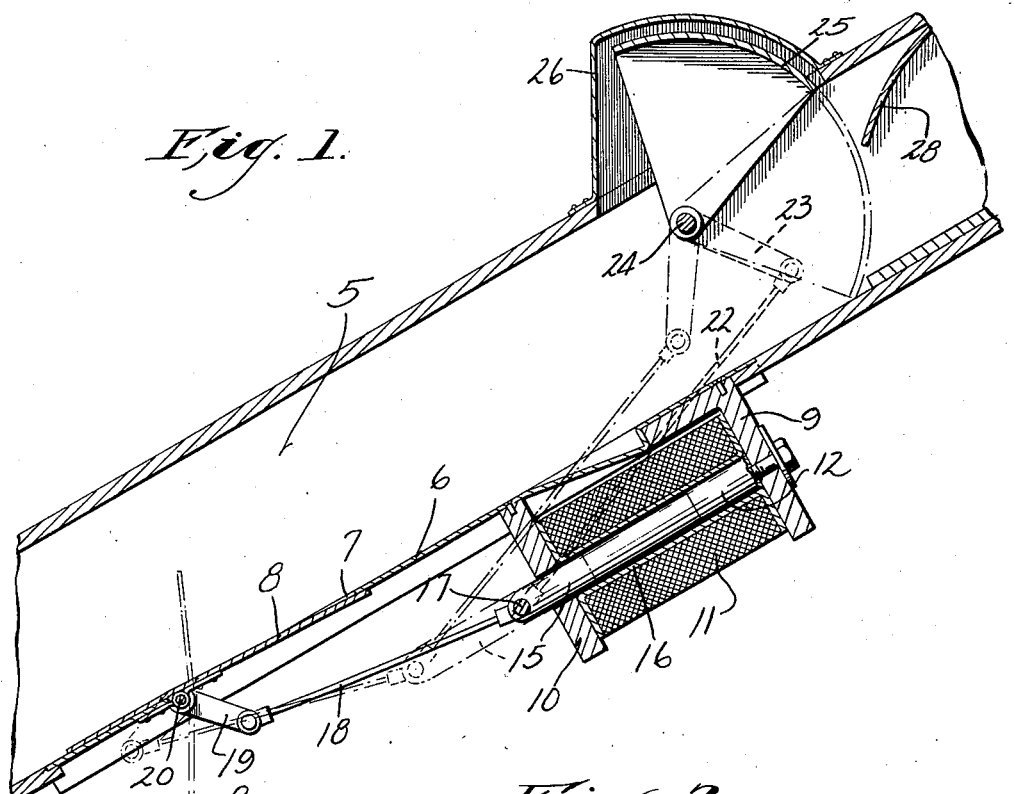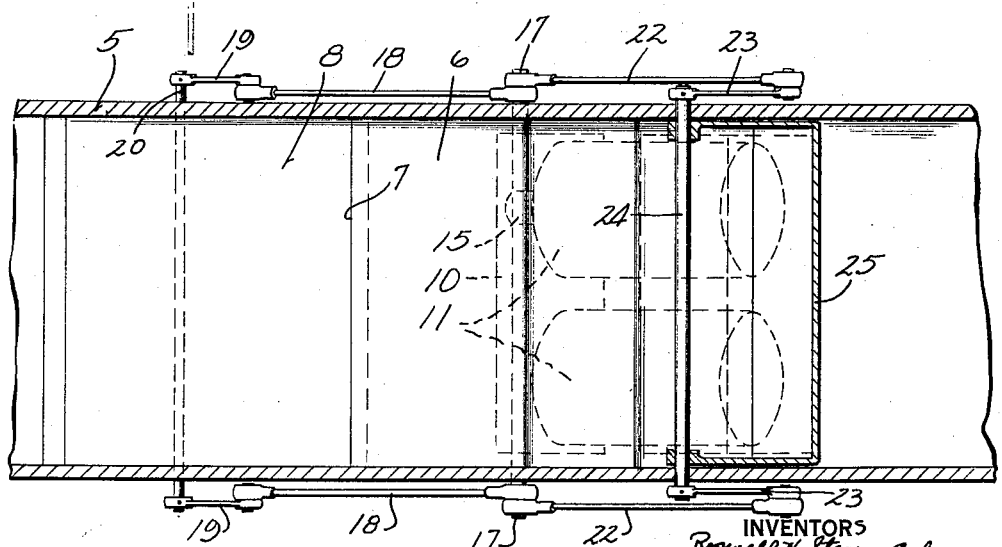

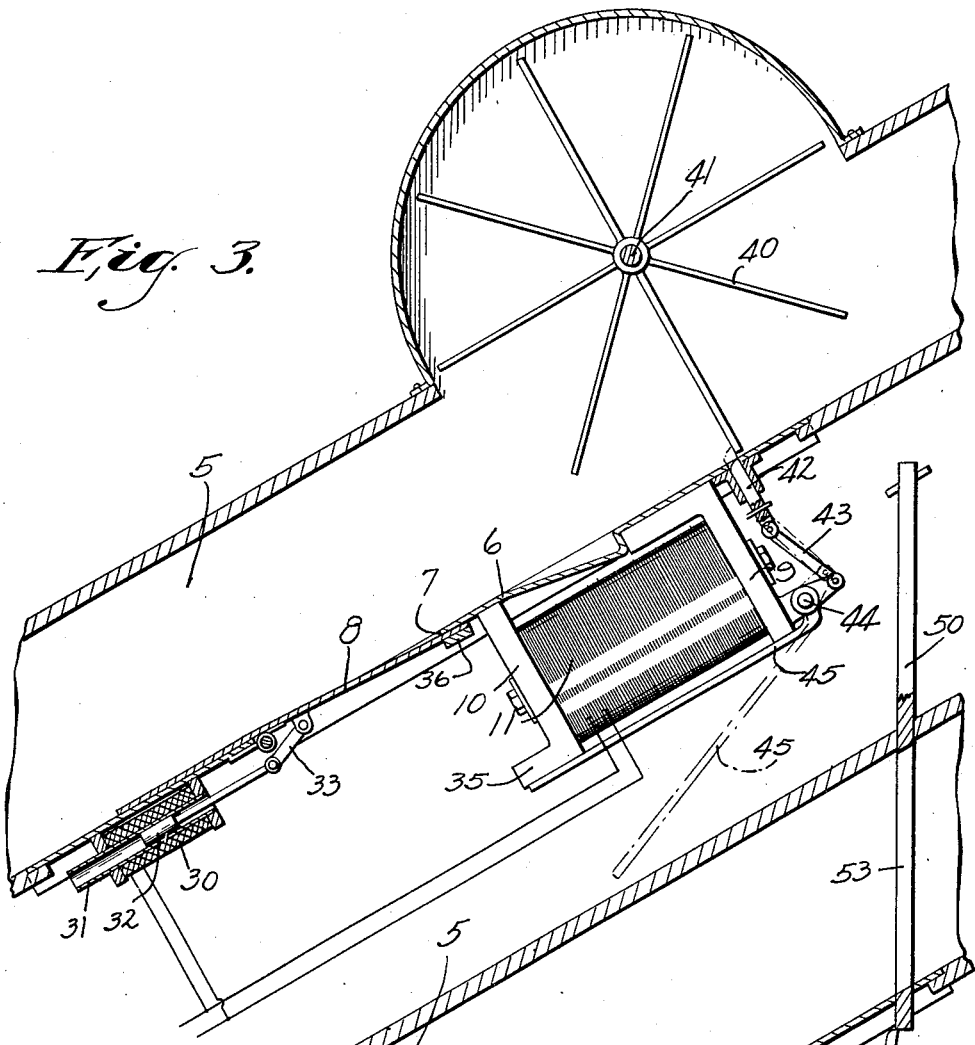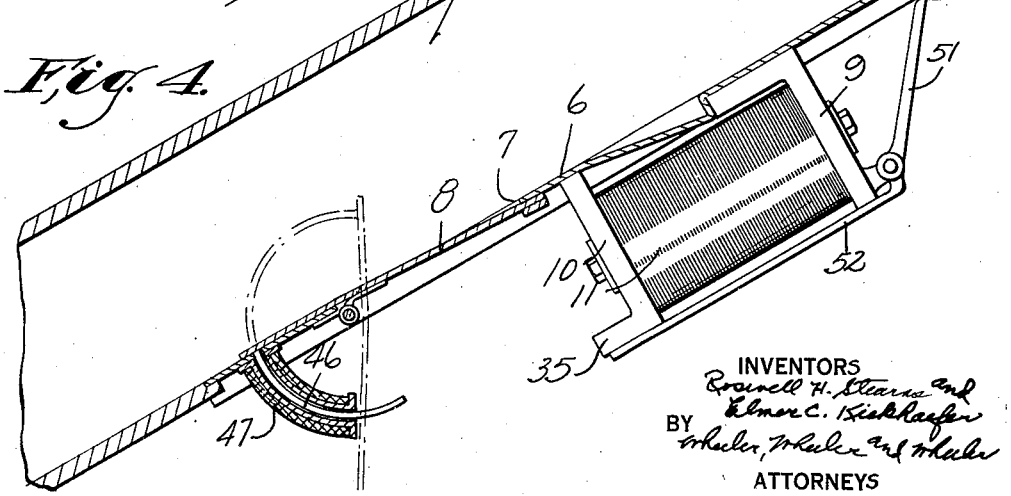

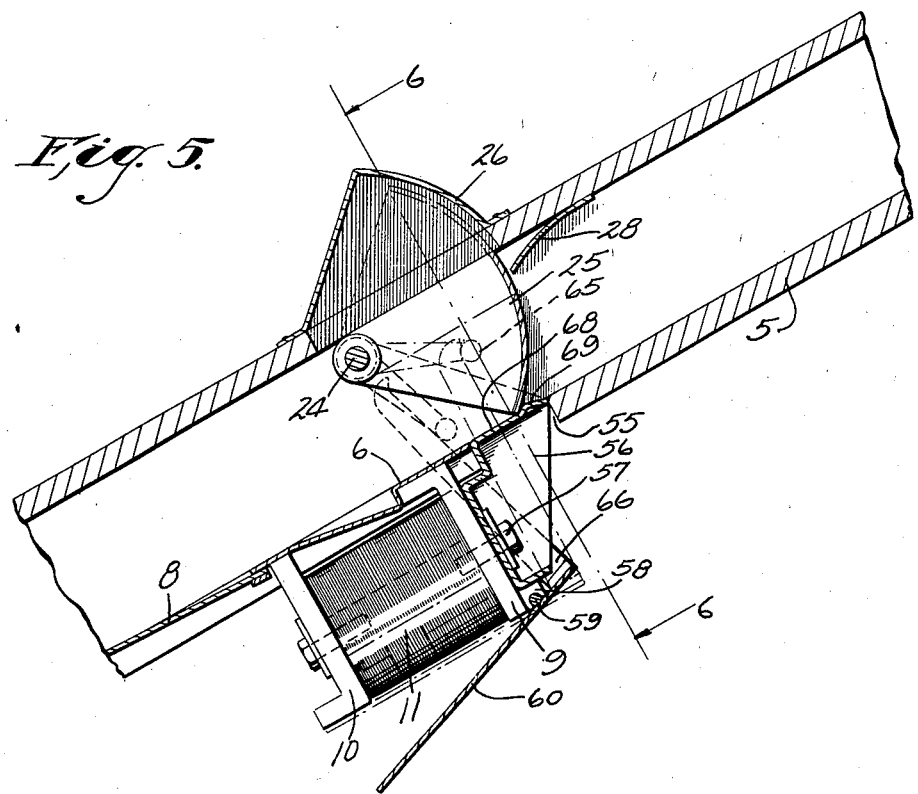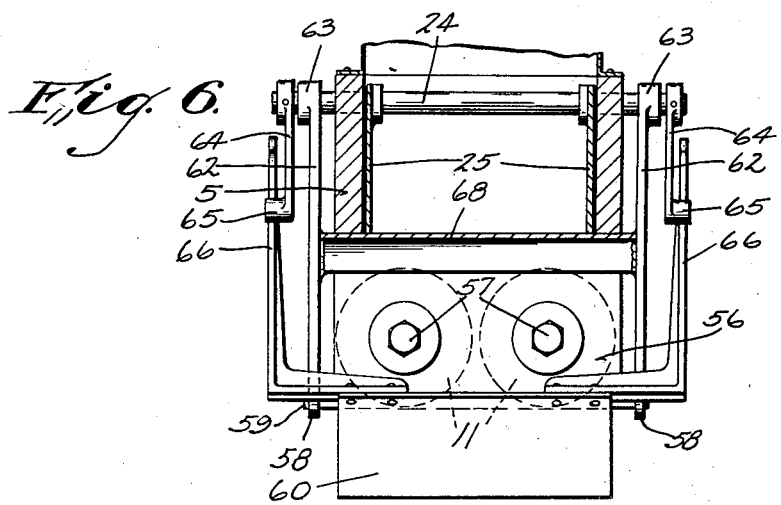

2,089,138

UNITED STATES PATENT OFFICE 2,089,138

SPOUT TYPE MAGNETIC SEPARATOR

Roswell H. Stearns and Elmer C. Kiekhaefer, Milwaukee, Wis., assignors to Stearns Magnetic Manufacturing Company, Milwaukee, Wis., a corporation of Wisconsin Application December 14, 1933, Serial No. 702,308

19 Claims. (Cl. 209—228)

This invention relates to improvements in spout type magnetic separators.

The traps below the separator magnet in such devices have been made automatically self-closing and opening according to the energization and de-energization of the magnet but, in the event of a failure of current to the electromagnet winding, it has been possible for the opening of the trap not only to release the tramp metal accumulated on the magnet, but also to release from the spout all of the grain or other material flowing therethrough, which, after being thus dumped, can only be recovered with considerable difficulty and inconvenience.

It is the object of the present invention to provide a magnetic separator construction such that the energization and de-energization of the separator magnet will concurrently effect not only the closing and opening of the trap, but will also control the passage of grain across the separator.

It is a further important object of the invention to provide means whereby the trap may, if desired, be operated by a magnet connected with the separator magnet, either in series or in parallel, but so disposed and organized that it will not tend to accumulate tramp iron upon the trap itself. In previous devices using auxiliary magnets for trap actuation, the magnets have been so disposed as to tend to hold on the trap some of the tramp iron caught by the separator, and to deliver such tramp iron over the trap with the grain or like material when the separator is de-energized.

In the drawings:

Figure 1 is a vertical section through a spout type separator embodying the present invention.

Figure 2 is a longitudinal section parallel to the plane of the spout.

Figure 3 is a vertical section showing a modified embodiment of the invention.

Figure 4 is a vertical section showing a further modified embodiment of the invention.

Figure 5 is a vertical section showing a further modified embodiment of the invention.

Figure 6 is a view taken in the plane indicated at 6—6 in Fig. 5 showing a transverse section therethrough.

Like parts are identified by the same reference characters throughout the several views.

In all of the views 5 represents a conventional spout for grain or the like, having in its bottom a plate 6 carrying the magnetic separating equipment. In this plate is an opening 7 which may be opened and closed by means of a trap door 8, preferably hinged intermediate its ends and preferably having its uppermost end opening downwardly so that its lowermost end will become erect in the spout to obstruct further passage of material therethrough when the trap is open. The major portion of the trap door 8 is located above the pivotal axis or hinged joint of the door, with its upper margin normally engaging underneath the plate 6, which serves as a stop. The portion below the hinge laps over the floor of the chute, the hinge being located at the lower margin of the opening 7, whereby, when the major portion of the door swings downwardly, the portion below the hinge will swing upwardly and form a wall across the chute at the lower side of said opening 7.

Beneath the plate 6 is the separator magnet which conventionally comprises two electromagnets placed side by side, having common upper and lower poles 9 and 10 and provided in the usual manner with individual cores and windings.

For the purposes of the construction shown in Figs. 1 and 2, the core of one of the magnets 11 is divided, one portion thereof being made fast to the pole 9 and the other portion 15 thereof comprising a plunger type of armature reciprocable through the spool 16 to and from the fixed core portion 12.

Connected with the combination core and armature 15 is a crosshead 17 which is engaged by means of links 18 with the arms 19 of the rock shaft 20 upon which the trap door 8 is fulcrumed, the arrangement being such that when magnetic winding 11 is energized, the armature-core element 15 will be drawn in, thereby automatically closing the trap 8.

The crosshead 17 is also connected by means of links 22 with the arms 23 of a rock shaft 24 which carries a gate 25 for cutting off the flow of the grain through the spout 5 whenever the separator magnet is de-energized. It will be noted from Fig. 1 that when armature-core 15 is drawn in by the energization of the winding 11, the gate 25 will be elevated into a hood 26, thereby leaving the grain free to flow beneath the gate. When the separator magnet is de-energized the weight of the gate and the weight of the longer end of the trap door 8, and the weight of the armature-core element 15, will cause the parts to move automatically to the dotted line positions shown in the drawings, whereby the tramp iron will be dumped through the opening 7 and the flow of grain through the spout will be concurrently shut off.

In order to facilitate the automatic closing of gate 25, the gate is preferably made to conform to a sector of a cylinder and the rock shaft 24 is set relatively high in the spout. Also a baffle is provided at 28 to confine the grain or other material to the lower portion of the spout at this point so that in moving beyond the baffle the gate will be moving with the grain or other material and will thus readily find its way to a closed position. The baffle 28 is also useful in reducing the thickness of the stream of material passing over the separator magnet, and it is also of utility in limiting the amount of material which must be acted upon by the gate 25 in its opening movement.

In the construction shown in Fig. 3 the energization of the separator magnet 11 does not of itself close the trap door 8. A separate magnet 30 in the form of a solenoid is provided for this purpose and is connected either in series or parallel with the magnet 11 to be energized and de-energized concurrently therewith.

It is one of the characteristics of a properly wound solenoid that the magnetic flux is confined to the center of the coil and hence will have substantially no effect whatever tending to accumulate tramp iron above it in the spout. Moreover, in the Fig. 3 construction the separator magnet 11 is located at such a distance from the trap actuating magnet 30 that there can be little possibility of a division of the tramp iron between the two magnets. The separator magnet will catch all of the tramp iron and none of it will tend to be drawn to the trap actuating magnet 30.

Slidable in a tubular guide 31 in the solenoid 30 is a piston type armature 32 connected by a link 33 with the trap 8 for the opening and closing thereof. While the separator magnet 11 does not effect such closing, it may contribute very materially thereto and, for this purpose, the pole piece 10 has an L-shaped extension 35 close to the path of movement of the gate 8 so that when the movement of such gate has once been initiated by the solenoid 30 to the point where the component of its movement is largely vertical, the effect of the separator magnet upon the armature bar 36 carried by the gate will be sufficient of itself to complete the closing movement.

To control the flow of grain through the spout 5 in the Fig. 3 device, a rotary gate 40 constructed like a paddle wheel and free to rotate upon axle shaft 41, is employed. When the magnet is de-energized a detent 42 is thrust into the path of the vanes of the paddle wheel gate by means of a link 43, rock shaft 44, and the weight of the armature bar 45. When the separator magnet is energized the armature bar 45 will be attracted by the poles 9 and 10 to comprise a shunt thereacross. Thereby the detent 42 will be retracted and the gate 40 will immediately be set in motion by the pressure of the accumulated grain or other material above it. As soon, however, as the separator magnet is de-energized, the paddle wheel gate will immediately come to rest and the flow of grain in the spout will stop.

In the Fig. 4 construction the operation of the gate is similar to that described in Fig. 3 with the exception that the solenoid coil 47 is wound upon an arc and the armature bar 46 which operates therethrough passes through a hole in the spout and is made fast directly to the trap door 8 without any intervening linkage.

The gate 50 which obstructs the grain is not automatic as to its opening but must be lifted by hand to the position in which it is shown in Fig. 4. In this position it is held by detent 51 and armature 52, with the opening 53 in the gate registering with the spout 5.

Whenever the magnet is de-energized the armature 52 will fall by gravity, thus allowing the gate 50 to drop to a position in which the spout will be closed.

It will, of course, be understood that from the standpoint of the gate closing function, the detents illustrated in Figs. 3 and 4 are, only for convenience, operated from the adjacent separator magnet, it being broadly immaterial whether the gate closing be controlled from the separator magnet or from a concurrently energized separate magnet such as that employed for the trap actuation. In the device shown in Figs. 1 and 2 the same magnet not only energizes the trap but also controls the gate which stops the flow of grain when the trap opens.

There are a large number of spout type magnetic separators in commercial use, and accordingly it is desirable to provide the present invention in such a form that it may be associated with a conventional separator previously manufactured. The construction shown in Figs. 5 and 6 is adapted for such installations and may readily be installed by any mechanic.

In this device the spout bottom is cut away at 55 to receive a bracket 56 which may be held to the magnetic separator assembly by means of the cap screws 57 which are used to bolt the pole 9 to the cores of the respective coils 11. This bracket is provided integrally with ears 58 supporting the pintle 59 and an armature 60 which is similar to the armatures shown at 45 and 52 in Figs. 2 and 4, being sufficiently heavy to be attracted to the poles 9 and 10, but not heavy enough to short circuit any considerable amount of flux between said poles.

Supported by the bracket 56, laterally offset at opposite sides of the sheet 5, are standards 62 provided with bearings at 63 for the rock shaft 24, upon which the gate 25 is mounted, these parts corresponding to the parts shown in Fig. 1 and Fig. 2. Rock shaft 24 carries arms 64 having laterally projecting fingers 65 slidably engaged by the arms 66 attached to the armature plate 60, the arrangement being such that when the magnetic separator is energized the armature plate will be attracted and will move about its pintle 59 to lift gate 25 by energy transmitted to the arm 66, finger 65, and arms 64, to rock shaft 24. When the current is cut off the armature 60 will drop to the position in which it is illustrated in Figs. 5 and 6, thereby allowing gravity to cause the gate 25 to drop to the position in which it is shown in Fig. 5.

The bracket 56 is provided with a floor section 68, preferably formed to provide a transverse rib at 69 below which the gate 25 seats. The abrupt descent on the lower side of the shoulder 69 makes it impossible for any material to accumulate beneath the gate to a sufficient extent to prevent its closing.

If the spout 5 is sufficiently steep to require a cover, the cover is apertured to receive gate 25, and the aperture is then enclosed in a hood 26 as shown in Fig. 5. Otherwise, if the spout is uncovered, no change in the spout is required for the addition of the bracket and its associated mechanism other than the cutting of the opening 55 in the bottom of the spout and the boring of holes in the sides of the spout for the shaft 24. The entire installation may readily be done in just a few minutes since all that is required is the provision of the necessary apertures in the spout and the removal of bolts 57 to receive the bracket 56, all of the requisite parts being carried by said bracket.

It will be understood that the various embodiments of this invention illustrated in the foregoing specification are intended to be merely illustrative of some of the numerous means of usefully employing in the art the broad invention herein disclosed and set forth in the appended claims.

We claim:

1. The combination with a spout having a trap door, of a magnetic separator having a movable core element and a connection between said core element and trap door for the actuation of said door in accordance with the energization and de-energization of the separator, said core element being located in the magnetic field of the separator and adapted for movement in a direction to close the trap door when the separator is energized.

2. The combination with an apertured spout provided with a trap door, of a separator magnet including a movable core element permanently within the intense portion of the magnetic field, a gate pivotally mounted to move across said spout for the interruption of material flow therethrough and for the release of such flow, and a connection from said core element to said gate and trap door whereby automatically to open said trap door and close said gate in accordance with the de-energization of said magnetic separator and to close said trap door and open said gate in accordance with the energization of said separator.

3. The combination with a magnetic separator and a rotary gate adapted to be actuated by the pressure of material passing said separator, of a detent for said gate engageable therewith to arrest the movement of the material acting thereon, and means automatically operable in accordance with the energization and de-energization of said separator to move said detent to and from engagement with said gate.

4. The combination with a spout adapted for the handling of small particles of material, of a paddle wheel gate mounted to turn in said spout under pressure of material passing therethrough, the axis of said gate being located above the material acting thereon, detent means adapted for normal movement to a position for arresting the movement of said gate to obstruct the flow of such material and electromagnetic separating means associated with said spout and provided with a movable armature connected with the detent to hold the latter in retracted position when the separator is energized.

5. The combination with a spout, of a paddle wheel gate mounted to turn in said spout under pressure of material passing therethrough, and detent means for arresting the movement of said gate to obstruct the flow of such material, together with a magnetic separator in said spout beyond said gate, means beyond said separator for deflecting material from its normal course, and means for electromagnetically actuating said deflecting means and said detent concurrently with the energization and de-energization of said separator.

6. The combination with a spout bottom having an aperture, of a trap door pivotally movable to open and close said aperture, an armature carried by said trap door, and a separator magnet having a pole piece extending downwardly from said spout bottom adjacent the upper margin of said aperture, and having its lower end portion provided with an extension in the direction of the downwardly and rearwardly curving path of the armature to extend the magnetic field in the direction of the position occupied by the armature when the trap door is open.

7. The combination with a spout and a separator magnet including pole members spaced longitudinally of the bottom of the spout and an electromagnetic winding between said members, of a gate biased for self-opening disposed in said spout above said magnet for the control of flow to the magnet, a detent adjustable to a position for holding said gate closed, an armature pivoted adjacent one of said pole members and having its free end spaced from the other pole member and movable thereto upon the energization of the magnet, and means for transmitting motion from said armature to said detent for the retraction of said detent to permit the opening of the gate upon the energization of the magnet, said armature being gravity biased for the adjustment of said detent to a gate restraining position automatically upon the de-energization of the magnet and said gate including means adapted for movement to engagement with said detent automatically to shut off flow through said spout upon such de-energization.

8. In a device of the character described, the combination with a spout and an electromagnetic separator operatively connected therewith, said spout having an opening in its bottom, of a trap door immediately beyond said separator for the control of said opening to release therethrough magnetic material accumulated by said separator, and a separate magnet beyond said trap door electrically connected with said separator to be energized concurrently therewith and provided with armature means connected with said trap door for the control thereof, said separate magnet having its field sufficiently confined and so located beyond said separator and trap door as not to accumulate magnetic material on the bottom of said spout.

9. The combination with a spout and an electromagnetic separator operatively associated with the bottom thereof, said spout having an aperture beyond said separator, of a trap door controlling said aperture for the discharge accumulated by the separator, an electromagnetic means operatively connected for energization and de-energization concurrently with said separator, said means having an armature operatively connected with said trap door for the opening thereof upon the de-energization of said separator and the closing thereof upon the energization of said separator, said electromagnetic means being located beyond said trap door and separator in a position such that its influence will not detract from the tendency of said separator to hold magnetic material above said trap door in said spout.

10. The combination with a spout and an electromagnetic separator operatively associated with the bottom of the spout, said bottom being apertured immediately beyond said separator, of a trap door for said aperture controlling the discharge therethrough of magnetic material accumulated by said separator, and a solenoid connected with said spout beyond said trap door and provided with an armature linked with said trap door for the actuation thereof, said solenoid being electrically connected with said separator to be energized and de-energized concurrently therewith for the opening of said trap door upon the de-energization of said separator and the closing of said trap door upon the energization thereof.

11. The combination with a grain delivery spout, of a set of gates at different levels, each adapted to close the spout, an intermediate trap door associated with the lower gate and subject to the pressure of material flowing through said spout, said trap door and gate being connected for alternate opening and closing movements, whereby such pressure of material tends to open the trap door and close the associated gate, an electromagnetic separator secured to the bottom of the spout intermediate of the gates and above the trap door, and an associated armature permanently within the intense portion of the magnetic field and operatively connected to maintain both gates in open position when the separator is energized.

12. In a device of the character described, the combination with an inclined spout and an electromagnetic separator associated therewith for retention of magnetizable material, of a gate controlling the flow of material through the spout, an auxiliary gate controlling the flow of material released from said separator when the latter is deenergized, and connections controlled by the separator for positively moving both gates to inoperative positions when the separator is energized, said gates being adapted to automatically close when the separator is deenergized.

13. The combination with a spout provided with an electromagnetic separator for retaining magnetizable material passing through said spout, of a swinging gate for controlling the flow of material through the spout, a movable detent for locking said gate in closed position, an armature adapted to be actuated by the electromagnet when energized, and linkage connecting the armature with the detent for retracting the detent when the armature is moved in one direction by magnetic attraction.

14. In a device of the character described, the combination with a spout having a magnetic separator associated with its bottom portion, means for restricting the flow of material through said spout to limit the depth of such material while passing over the magnetic separator, a gate pivotally supported adjacent the upper wall of said spout and movable in an arcuate path to and from the bottom thereof, said gate being biased to close automatically across said spout when the separator is deenergized, and a movable armature associated with said separator and provided with means for holding the gate open when the separator is energized, said gate being formed to utilize the pressure of material upon its upper surface to force the same toward closed position when released by the armature.

15. The combination with the walls of an inclined spout for grain and similar materials, of a set of gates at different levels each adapted to close the spout against the passage of material therethrough, means associated with the lower gate for deflecting material from between the gates when the lower gate is closed, means for intermittently maintaining a magnetic field in the portion of the spout between the gates, said gates being self closing and said deflecting means self opening when the magnetic field is interrupted, and means for utilizing said magnetic field to hold both gates open and the deflecting means closed during separating operations.

16. The combination with the walls of an inclined spout and an associated electromagnet adapted to establish a magnetic field through a portion of said spout to retain magnetizable material in contact with the walls of the spout when the magnet is energized, a set of gates respectively controlling the flow of material into and out of said magnetic field, a trap door for releasing material from said portion of the spout when the lower gate is closed, a movable armature associated with said electromagnet and linked to the lower gate and trap door, and auxiliary linkage connecting said armature with the upper gate, whereby, when the armature is attracted by the electromagnet, both gates will be held open with the trap door closed to permit uninterrupted passage of material through said spout, said armature being permanently supported within the influence of both poles of the electromagnet.

17. The combination with a spout in a magnetic separator, of gate means disposed in the spout above the separator and adapted to stop the flow of material through the spout toward the separator, a detent controlling the movement of said gate means, an armature movable with respect to the separator and positioned sufficiently close thereto to be energized by the energization of the separator, and a connection from said armature to said detent for the magnetic actuation of the detent in one direction and gravity actuation of the detent in another direction to and from operative position of engagement with said gate means, whereby said gate means is automatically controlled in accordance with the energization and de-energization of said separator.

18. The combination with a spout and a magnetic separator therein, of a gate mounted on said spout above said separator for movement toward a closed position across said spout to stop the flow of material therethrough toward said separator, the movement of said gate toward said closed position having a component of movement in the same direction as that of the material whereby the closing movement of said gate will be assisted by material flowing toward said separator through said spout, a movable armature member associated with the separator to be energized thereby, and means connecting said armature member with said gate for the transmission of motion to said gate in the direction of the opening thereof thru the energization of the separator.

19. A spout type magnetic separator comprising the combination with a spout, of an electromagnet disposed therein and provided with pole means adapted when energized to intercept the flow of electromagnetic material through the spout, a gate for controlling the flow of material through the spout toward the magnet and comprising a sector of a cylinder and pivoted to an upper portion of the spout, whereby its closing movement will have a component of direction like that of the material approaching the magnet, and armature means within the magnet field operatively connected with said gate in a direction for the opening thereof upon the energization of the magnet, said gate being biased for automatic closing upon the de-energization of the magnet.

ROSWELL H. STEARNS.
ELMER C. KIEKHAEFER.